US012580361B2

(12) United States Patent
Huang et al.

(10) Patent No.: US 12,580,361 B2
(45) Date of Patent: Mar. 17, 2026

(54) SYSTEM AND METHOD FOR MANUFACTURING ALL-FIBER SIDE-PUMP COMBINERS WITH PLURALITY OF PUMPS

(71) Applicant: Lightel Technologies, Inc., Renton, WA (US)

(72) Inventors: Shangyuan Huang, Bellevue, WA (US); Po-Chih Hsu, Kaohsiung (TW); Hsuan-Chieh Chang, Bonney Lake, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 906 days.

(21) Appl. No.: 17/749,078

(22) Filed: May 19, 2022

(65) Prior Publication Data

US 2023/0378710 A1      Nov. 23, 2023

(51) Int. Cl.
| | |
|---|---|
| *H01S 3/094* | (2006.01) |
| *C03B 37/014* | (2006.01) |
| *G02B 6/28* | (2006.01) |
| *H01S 3/04* | (2006.01) |
| *H01S 3/067* | (2006.01) |

(52) U.S. Cl.
CPC .. *H01S 3/094019* (2013.01); *C03B 37/01486* (2013.01); *G02B 6/2856* (2013.01); *H01S 3/04* (2013.01); *H01S 3/06745* (2013.01); *H01S 3/094007* (2013.01)

(58) Field of Classification Search
CPC ........... H01S 3/094019; H01S 3/06745; H01S 3/06716; H01S 3/1618; G02B 6/02376; G02B 6/2552; G02B 6/287; G02B 6/02;

G02B 6/02052; G02B 6/03622; G02B 6/14; G02B 6/024; G02B 6/03611; G02B 6/0365; G02B 6/03694; C03B 2201/10; C03B 2201/12; C03B 2201/14; C03B 2201/28; C03B 2201/31; C03B 2201/32; C03B 2201/34; C03B 2201/36; C03B 2203/04; C03B 2203/10; C03B 2203/23; C03B 2203/18; C03B 2203/30; C03B 2205/08; C03B 2205/13; C03B 2205/44; C03B 37/85; C03B 37/90; C03B 37/01413; C03B 37/01228; C03B 37/0124;

(Continued)

(56) References Cited

U.S. PATENT DOCUMENTS 4,294,601 A * 10/1981 Dabby .............. C03B 37/01413
                                                     65/144
4,979,972 A * 12/1990 Berkey ............... C03B 23/0473
                                                     65/408

(Continued)

FOREIGN PATENT DOCUMENTS

| CN | 109494554 A | * | 3/2019 | ......... H01S 3/06708 |
| CN | 215180999 U | * | 12/2021 | |
| EP | 2660637 A1 | * | 11/2013 | ....... H01S 3/094003 |

*Primary Examiner* — Thomas A Hollweg
*Assistant Examiner* — Erin D Chiem
(74) *Attorney, Agent, or Firm* — Andy M. Han; Han IP PLLC

(57) ABSTRACT

An apparatus includes an all-fiber side-pump combiner fabrication system and a control unit coupled to control operations of the all-fiber side-pump combiner fabrication system to produce a (N+1)×1 combiner with N side pump fibers.

12 Claims, 9 Drawing Sheets

(58) Field of Classification Search
CPC .......... C03B 37/01245; C03B 37/0253; C03B
37/02754; C03B 37/02763
See application file for complete search history.

(56) References Cited

U.S. PATENT DOCUMENTS

| | | | |
|---|---|---|---|
| 5,139,550 A * | 8/1992 | Nicholls ................ | G02B 6/245 |
| | | | 65/424 |
| 5,183,490 A * | 2/1993 | Mikami ................ | C03B 37/014 |
| | | | 65/144 |
| 5,864,644 A * | 1/1999 | DiGiovanni ......... | G02B 6/2856 |
| | | | 385/48 |
| 6,301,412 B1 * | 10/2001 | Mori .................... | G02B 6/2856 |
| | | | 385/46 |
| 6,793,775 B2 * | 9/2004 | Gouskov ........... | C03B 37/01426 |
| | | | 162/382 |
| 8,733,131 B2 * | 5/2014 | Cocchini .......... | C03B 37/01486 |
| | | | 65/421 |
| 9,871,338 B2 * | 1/2018 | Price ................. | H01S 3/094007 |
| 11,511,357 B2 * | 11/2022 | Takahashi .............. | B23B 23/00 |
| 2002/0046578 A1 * | 4/2002 | Fischer ................ | C03B 33/095 |
| | | | 65/271 |
| 2005/0214737 A1 * | 9/2005 | Dejneka ........... | B01L 3/502761 |
| | | | 435/287.1 |
| 2012/0073331 A1 * | 3/2012 | Tachikura ............. | G02B 6/255 |
| | | | 65/439 |
| 2015/0007615 A1 * | 1/2015 | Gapontsev ........... | C03B 37/028 |
| | | | 65/402 |

* cited by examiner (a)

(b)

(C)

SYSTEM AND METHOD FOR MANUFACTURING ALL-FIBER SIDE-PUMP COMBINERS WITH PLURALITY OF PUMPS

TECHNICAL FIELD

The present disclosure relates to optical combiners and, more specifically, to a system and method for manufacturing all-fiber side-pump combiners with a plurality of pumps.

BACKGROUND

High power fiber lasers have gained wide applications because of their simple structure, high efficiency, and good beam quality. As one of the key components in fiber laser or amplifier systems, pump/signal combiners are used to couple pump light into a signal fiber. The signal fiber is a double clad-fiber (DCF) with an inner cladding having a large cross section and a high numerical aperture (NA), thus allowing high pump power to be received.

Today's most popular pump/signal combiners are based on an all-fiber taper-fusing approach. This approach has been widely used in high power fiber laser systems owing to its simplicity, compactness, and compatibility. This kind of combiner, often called (N+1)×1 combiner, consists of N pump fibers and a DCF signal fiber, with N being a positive integer. Further, based on the pump light injection access, there are two types of (N+1)×1 combiners: end-pump and side-pump. The former is to inject pump light through the end of DCF, while the latter is to inject pump light through the side of DCF.

In today's fiber laser and amplifier systems, the end-pump type is more common because of their relative simplicity in fabrication and good device performance. Many related patents and papers have been published and many commercial products are available in the market. However, with continuously increasing demands on the laser power, end-pump combiners started to show some limitations. It is known that higher lasing power is often accompanied by various nonlinear effects, such as stimulated Raman scattering (SRS), transverse mode instability (TMI), and so on. Recent experiments have shown that a counter-pumping or bi-directional pumping scheme is beneficial for raising the threshold of SRS and TMI, thus allowing higher laser power operations. Obviously, end-pump combiner is not a good combiner candidate used for backward pumping. Since the DCF on the bundle side is subject to tapering, its core size becomes smaller than the original DCF core on the other side of the combiner. Consequently, if the combiner is reversely positioned, a bottleneck is created in the laser output path. In this case, in addition to high signal loss and attendant heat issues, the beam quality of the laser output could be degraded. A possible solution to avoid mismatch is to use two different sizes of DCF for the input and output signal fibers, at the cost of losing fiber consistency in the system.

As mentioned above, in a side-pump combiner, the pump light is coupled through the side of DCF. This allows the DCF to remain a continuous piece, without any interruption from the signal input through the output. Thus, the signal insertion loss of a side-pump combiner is expected to be very low no matter it is used in a forward manner or a backward manner. In addition, its non-interruptive nature allows easily adding cascaded pumping stages along the gain fiber.

The idea of using a converged taper of pump fiber to non-coaxially feed pump light into the inner cladding of DCF has been proposed. However by far, due to the fabrication difficulty, only (1+1)×1 and (2+1)×1 side-pump combiners are available in the market.

To make a quality side-pump combiner, first of all, the tapering ratio (or tapering shape) of each pump fiber needs to be well controlled. Secondly, it is essential to well control the fiber configuration among the central signal DCF and all the surrounding pump tapers, especially when these tapers are extremely thin. For (1+1)×1 and (2+1)×1, only a two-dimensional (2D) configuration is involved so that the fiber configuration control is relatively easy. But, when N>2, a three-dimensional (3D) fiber control is desired during all processing steps. A disclosure of fabricating (N+1)×1 (where N>2) side-pump combiners has been proposed previously. Two (6+1)×1 combiner structures have also been proposed. The first one is a true side-pump structure (see FIG. 1), while the second structure is virtually an end-pump that involves cleaving and splicing. In the patent, a few basic fabrication steps are described but there are no details about the system and process. Judging from the disclosed results, its prototype performance seems not sufficient to meet the requirements of high-power applications. Another disclosure is about a modified (N+1)×1 combiner (N>2). In order to achieve a better coupling efficiency, instead of feeding the pump light into DCF via pump fiber tapers directly, each pump fiber is now fused to an intermediate coreless fiber first and then couples the pump light to DCF via the coreless fiber tapers. Such a design makes the combiner structure and fabrication more complicated and less practical. That approach also advocates certain processing setup and method; but again, it is more conceptual than manufacturing practice.

It is, therefore, desirable to provide a practical dedicated system and method for manufacturing multi-fiber side-pump combiners that allows all processes sequentially completed on a given platform.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, an apparatus may include an all-fiber side-pump combiner fabrication system and a control unit.

The all-fiber side-pump combiner fabrication system may be configured to receive a fiber group comprising a signal fiber and a plurality of pump fibers. The control unit may be coupled to control operations of the side-pump combiner fabrication system to process the fibers to produce a (N+1)×1 combiner with N side pump fibers, where N is a positive integer (e.g., N≥1). In controlling the operations of the side-pump combiner fabrication system, the control unit may control the side-pump combiner fabrication system with respect to at least a mechanical positioning, a mechanical motion, a mechanical speed, a heating temperature, a dynamic heating-zone scanning pattern and speed, a fiber tension, and a fabrication recipe. In some implementations, the all-fiber side-pump combiner fabrication system may include: (a) first and second pump-fiber clamping fixtures each mounted on a respective one of first and second sliding modules such that the central longitudinal axis of each of the first and second pump-fiber clamping fixtures is aligned with a system axis of the side-pump combiner fabrication system and that each of the first and second pump-fiber clamping fixtures is slidingly movable in directions along the system axis with a closed-loop tension control on the clamped pump-fiber array; (b) first and second signal-fiber clamps each mounted on a respective adjustment module such that the fiber clamping positions are adjusted to ensure a clamped signal fiber coincident with the system axis (i.e., the central longitudinal axis of each of the first and second pump-fiber clamping fixtures), with at least one of the adjustment modules being slidingly movable in a direction parallel to the system axis to provide tension auto-control on the signal fiber; and (c) a heating source configured to create a heating zone on the fibers around the system axis. Each of the first and second pump-fiber clamping fixtures may include a sleeve and a shaft surrounded by and rotatably received in the sleeve such that: (i) the shaft comprises a signal-fiber slot and a plurality of pump-fiber slots; (ii) the shaft comprises a convergent extension section resulting in each of a plurality of pump-fiber slots with a flat section and a tilted section; (iii) the shaft further comprises a through-channel along the central longitudinal axis for a signal fiber passing through without interference; (iv) the signal-fiber slot is configured to guide a signal fiber to the through-channel; and (v) each of the plurality of pump-fiber slots is configured to receive and clamp a respective one of a plurality of pump fibers of the pump-fiber array. In operation, the control unit may be configured to perform operations comprising: (1) with the plurality of pump fibers loaded in the plurality of pump-fiber slots of each of the first and second pump-fiber clamping fixtures and clamped along the flat section of each slot: (1a) controlling the first and second sliding modules to gradually move the first and second pump-fiber clamping fixtures apart to taper the pump-fiber array; (1b) during the tapering controlling the heating source to longitudinally scan the heating zone back and forth along the system axis to achieve a predefined taper ratio and taper length for each of the plurality of pump fibers; (2) with the signal fiber being guided to the through-channel of each of the first and second pump-fiber clamping fixtures (through each of their signal-fiber slots) and then clamped by the first and second signal-fiber clamps, controlling the slidingly-movable adjustment module(s) to straighten the signal fiber while monitoring the stretching force applied to the signal fiber; (3) slightly moving closer the sliding modules toward each other (e.g., by tens of microns) so as to slightly loose the pump-fiber array, and then switching the fiber clamping positions of the plurality of pump fibers on the shaft in the plurality of slots from the flat section to the tilted section to result in surrounding pump tapers that are concentrically bent and adequately reaching the signal fiber; (4) with monitoring and controlling the tension on the pump-fiber array, slowly rotating either or both of the shafts of the first and second pump-fiber clamping fixtures to result in a relative rotation between the shafts of the first and second pump-fiber clamping fixtures to form a fiber bundle; and (5) controlling the heating source to fuse the fiber bundle with a fusion range covering the converging portion of the pump tapers.

In another aspect, an all-fiber side-pump combiner fabrication method may involve: (1) with a plurality of pump fibers of a fiber array loaded and clamped in a plurality of pump-fiber slots (to their flat sections) of each of first and second pump-fiber clamping fixtures each mounted on a respective one of first and second sliding modules such that the central longitudinal axis of each of the first and second pump-fiber clamping fixtures is aligned with a system axis of an all-fiber side-pump combiner fabrication system and that each of the first and second pump-fiber clamping fixtures is slidingly movable in directions along the system axis: (1a) controlling the first and second sliding modules to gradually move the first and second pump-fiber clamping fixtures apart to taper the pump-fiber array; (1b) during the tapering controlling a heating source to longitudinally scan the heating zone back and forth along the system axis to achieve a predefined taper ratio and taper length for each of the plurality of pump fibers; (2) with a signal fiber being guided to a through-channel of each of the first and second pump-fiber clamping fixtures (through a signal-fiber slot of each of the first and second pump-fiber clamping fixtures) and then clamped by first and second signal-fiber clamps each mounted on a respective adjustment modules with at least one of the modules being slidingly movable, controlling the slidingly-movable adjustment module to straighten the signal fiber while monitoring the stretching force applied to the signal fiber; (3) slightly moving closer the sliding modules toward each other (e.g., by tens of microns) so as to slightly loose the pump-fiber array, and then switching the fiber clamping positions of the plurality of pump fibers on a shaft of each of the first and second pump-fiber clamping fixtures in a plurality of slots on the shaft from a flat section to a tilted section to result in surrounding pump tapers that are concentrically bent and adequately reaching the signal fiber; (4) with monitoring and controlling the tension on the pump-fiber array, slowly rotating either or both of the shafts of the first and second pump-fiber clamping fixtures to result in a relative rotation (e.g., a relative rotation of 360°) between the shafts of the first and second pump-fiber clamping fixtures to form a fiber bundle; and (5) controlling the heating source to fuse the fiber bundle with a fusion range covering the converging portion of the pump tapers. In some implementations, the all-fiber side-pump combiner fabrication system may include: (a) the first and second pump-fiber clamping fixtures mounted on the first and second sliding modules, respectively, such that the central longitudinal axis of each of the first and second pump-fiber clamping fixtures is aligned with the system axis of the side-pump combiner fabrication system and that each of the first and second pump-fiber clamping fixtures is slidingly movable in directions along the system axis; (b) the first and second signal-fiber clamps each mounted on a respective adjustment module such that the fiber clamping positions are adjusted to ensure a clamped signal fiber coincident with the system axis (i.e., the central longitudinal axis of each of the first and second pump-fiber clamping fixtures), with at least one of the adjustment modules being slidingly movable in a direction parallel to the system axis to provide tension auto-control on the signal fiber; and (c) a heating source configured to create a heating zone on the fibers around the system axis. In some implementations, each of the first and second pump-fiber clamping fixtures comprises a sleeve and the shaft surrounded by and rotatably received in the sleeve such that: (i) the shaft comprises a signal-fiber slot and a plurality of pump-fiber slots; (ii) the shaft comprises a convergent extension section resulting in each of the plurality of pump-fiber slots with the flat section and the tilted section; (iii) the shaft further comprises a through-channel along the central longitudinal axis for a signal fiber passing through without interference; (iv) the signal-fiber slot is configured to guide a signal fiber to the through-channel; and (iv) each of the plurality of pump-fiber slots is configured to receive and clamp a respective one of the plurality of pump fibers of the fiber array.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
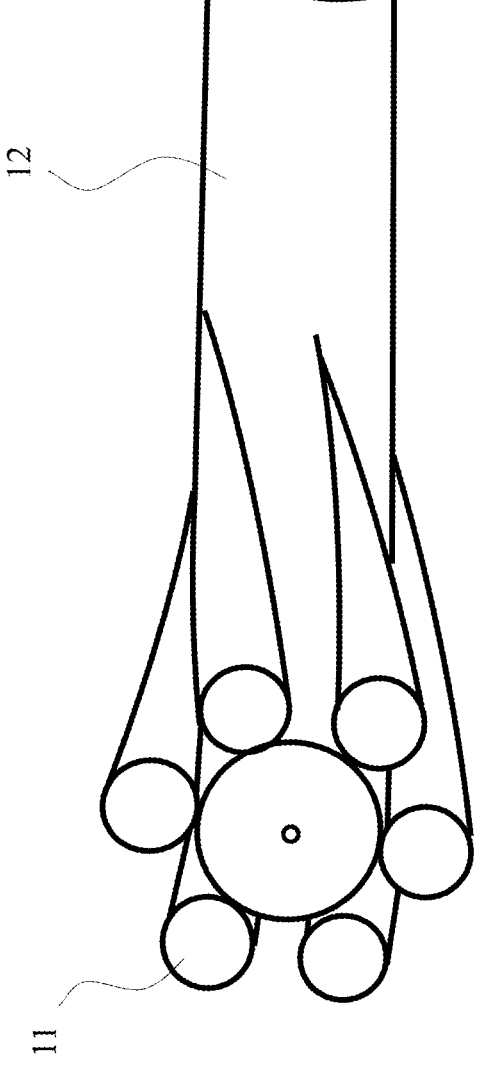
FIG. 1 illustrates the structure of an all-fiber (6+1)×1 side-pump combiner.

To help describe the proposed schemes, the structure of an all-fiber side-pump combiner with a plurality of pump inputs is illustrated in FIG. 1. During its fabrication, all pump fibers 11 are pre-tapered first. Then, via twisting, attach the tapered portions of the pump fibers 11 to the surface of a bared signal DCF 12. Finally, fuse the converged portions of the pump tapers to the DCF 12, and then remove the diverged portions of the tapers.

As mentioned above, the manufacturing of an all-fiber side-pump combiner involves several fundamental means of optical fiber processing, such as fiber tapering, bundling, and fusing. Obviously, in order to well handle multiple fibers and manage sequential processes, a specific system with dedicated design is needed. First of all, because the waist of each pre-tapered pump fiber is very thin (taper waist <10% of the original pump fiber diameter), they become too fragile to be moved around and to be configured. Therefore, all pump fibers should be pre-positioned in their designated places and then be tapered synchronically. Thus, accordingly, the heating field for multiple-fiber tapering must be adequately wide and uniform to ensure the consistency of all tapers. Secondly, the taper shape of the pump tapers as well as their bundling to the DCF should be controllable. Third, the fusion process should be manageable for achieving high coupling efficiency and low signal insertion loss at the same time. Finally, all processing parameters are centrally controlled through a user-friendly program.

Figure 2:
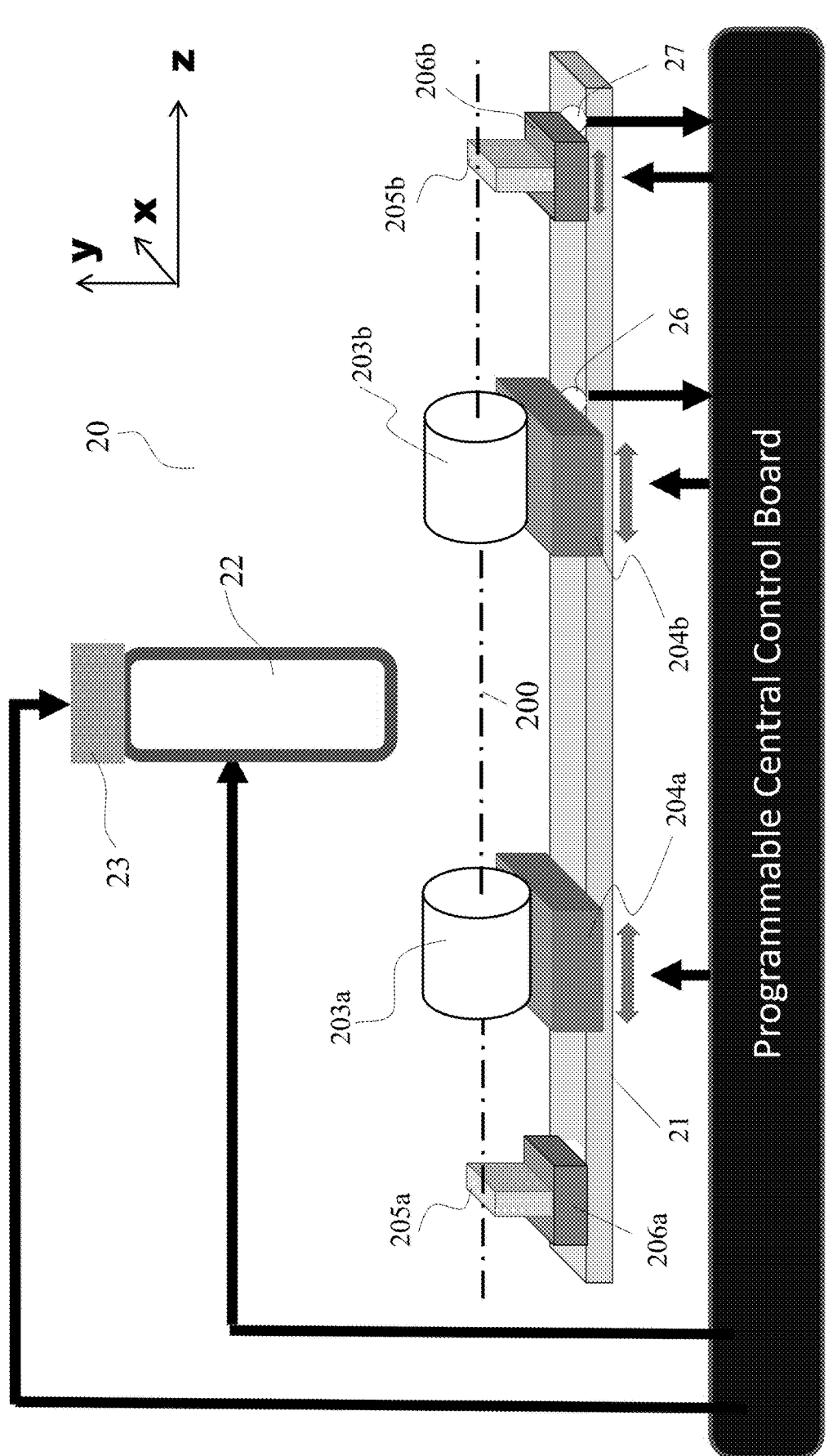
FIG. 2 illustrates a schematic block diagram of a preferred processing system for manufacturing all-fiber side-pump combiners.

FIG. 2 shows a schematic block diagram of a preferred embodiment of processing system 20 under a proposed scheme in accordance with the present disclosure. The entire fabrication process for an all-fiber side-pump combiner is intended to be completed on this system 20. Two pump-fiber clamping fixtures, 203*a* and 203*b*, for clamping pump fibers are respectively mounted on two sliding modules, 204*a* and 204*b*. The central longitudinal axis of each of 203*a*/203*b* is well aligned to a system axis 200 of system 20. The two motor-driven sliding modules 204*a*/204*b* can slidingly move along a base 21 of system 20 in Z-direction of an X-Y-Z coordinate system shown in FIG. 2, which is parallel to the system axis 200. Another pair of fiber clamps, 205*a* and 205*b*, for clamping a signal fiber, is respectively mounted on adjustment modules 206*a* and 206*b*. Both modules 206*a* and 206*b* are carefully adjusted to ensure that a clamped signal fiber is coincident with the system axis 200, i.e., the central longitudinal axis of each of 203*a*/203*b*. In addition, in order to control the stretching force applied to the signal fiber, at least one of the modules (e.g. 206*b* in FIG. 2) can be motor-driven in Z direction. A heating source 22 can be disposed and oriented to aim, direct or point to a central zone of system 20 to create a heating field thereto. The heat pointing position of heating source 22 can be tuned in X and Y dimensions through a motor-driven module 23, and this module can also scan a heating zone to direct heat along the Z-direction (or along the system axis 200). As can be seen from FIG. 2, all the mechanical controls as well as the heating temperature control are managed by one or more processors of a control unit (e.g., a programmable central control board). On the other hand, this control unit can also monitor certain processing data for closed-loop controls. For example, through the feedbacks from tension sensors, 26 and 27, the stretching forces on a pump-fiber array and a signal fiber are real-time monitored and controlled, respectively.

Figure 3:
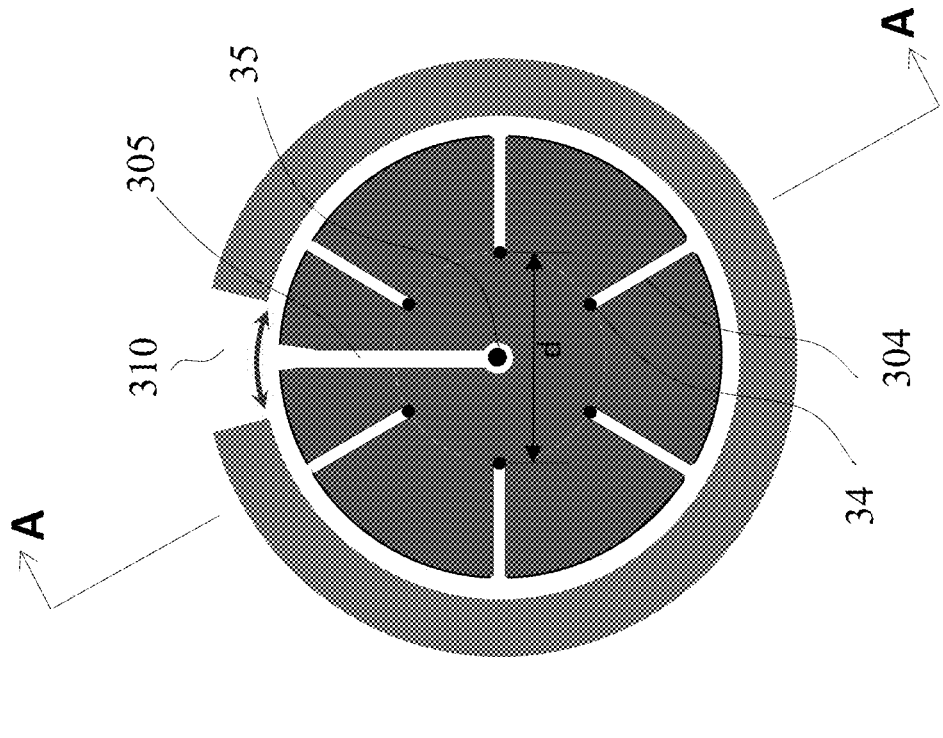
FIG. 3 illustrates a pump-fiber clamping fixture for clamping six pump fibers.
Figure 3:
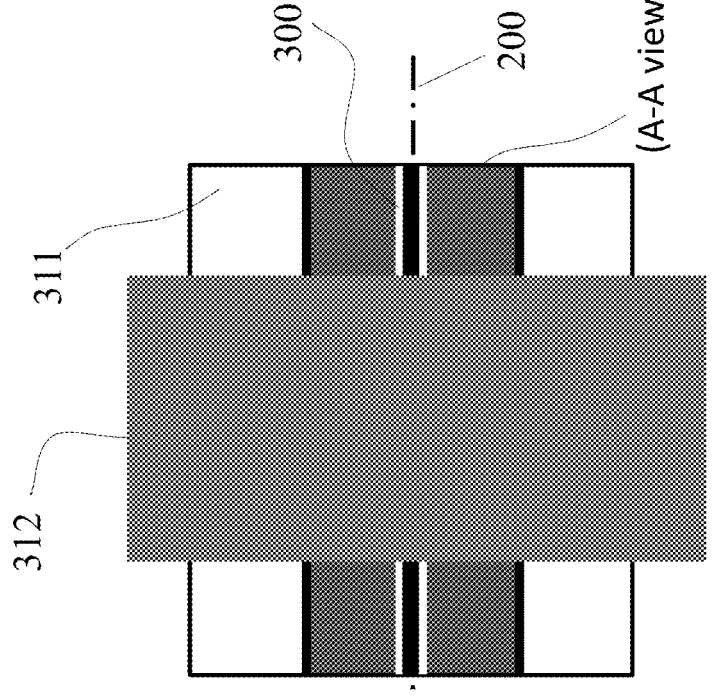

In one embodiment of a proposed scheme in accordance with the present disclosure, FIG. 3 illustrates the structure of a pump-fiber clamping fixture (referred to as 203*a* or 203*b* in FIG. 2) for clamping six pump fibers. This fixture may be formed by a pair of shaft 311 and sleeve 312. Its side view and end view are shown in the left and right portions of FIG. 3, respectively. (For illustration purpose, the central portion of the shaft in side view shows the A-A section.) Six identical slots 304 for six pump fibers 34 are uniformly distributed around the shaft 311. After each pump fiber is loaded to the bottom of its slot, the pump fibers form a cylindrical pump-fiber array surrounding center line 200 with an array diameter d. Another slot 305 for signal fiber (DCF) 35 is deeper, which can guide a signal fiber 35 to the through-channel 300 at the shaft center. The slot widths of 304 and 305 are designed to be barely wider than the coating diameters of the pump fibers and the signal fiber respectively, but the diameter of through-channel 300 may be 30~40% greater than the coating diameter of the signal fiber in order to allow a signal fiber passing through the shaft without interference. The shaft 311 can be rotated in the sleeve 312, and an opening 310 on the top of the sleeve 312 allows loading fibers in turn. Note that this shaft rotation can be either motor-driven (not shown in FIG. 2 and FIG. 3) or manually.

As mentioned above, to pre-taper the six pump fibers synchronically, a sufficient isothermal heating field is required. Clearly, the depth of pump-fiber slots 304 determines the array diameter d, and thus the required size of the isothermal heating zone. In order to avoid the pump fibers touching each other during pre-tapering, the fiber spacing should not be too small. Also considering the machining difficulty of such shaft 311, the array diameter d is generally at least 2 mm.

Figure 4A:
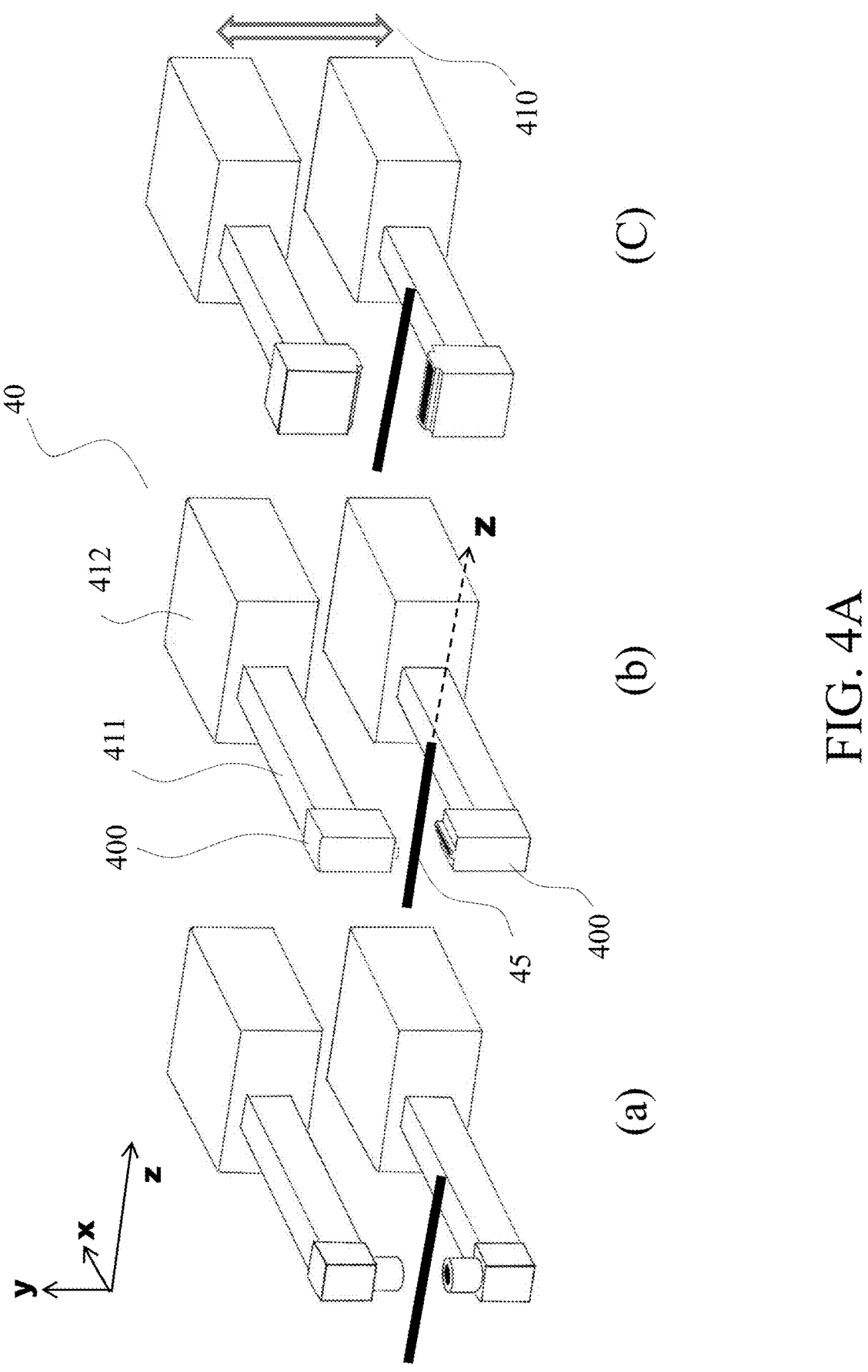
FIG. 4A shows three different $H_2/O_2$ flame torch designs, with part (a) showing a circular design, part (b) showing a linear-vertical design, and part (c) showing a linear-horizontal design.

FIG. 4A shows an embodiment of heating sources under a proposed scheme in accordance with the present disclosure. The heating source may be based on hydrogen/oxygen ($H_2/O_2$) flames. Three different designs of torch modules, 40, are shown in parts (a), (b) and (c) of FIG. 4A, respectively. Their common feature is that each design of torch module 40 consists of two torches; one is on the top and the other is on the bottom, and they are facing each other. Each torch head 400 of torch module 40 is supported by a beam 411 and a base 412, through which gases $H_2$ and $O_2$ are delivered from back to the torch head 400. The spacing between the two torch heads 400 can be adjusted (410) and optimized for the process. After ignition, a downward flame and an upward flame are produced from the top head and the bottom head respectively. It can be seen through the flame pillar patterns in FIG. 4B that, by choosing proper gas flow rates with proper proportions (among the top and bottom, $H_2$ and $O_2$), a proper heating field can be obtained. Through optimizing the X-Y position of the torch module 40 (see FIG. 4A), the heating field can be well aligned to a fiber array 45, such that all fibers in the fiber array 45 fall in the same isothermal zone.

Figure 5:
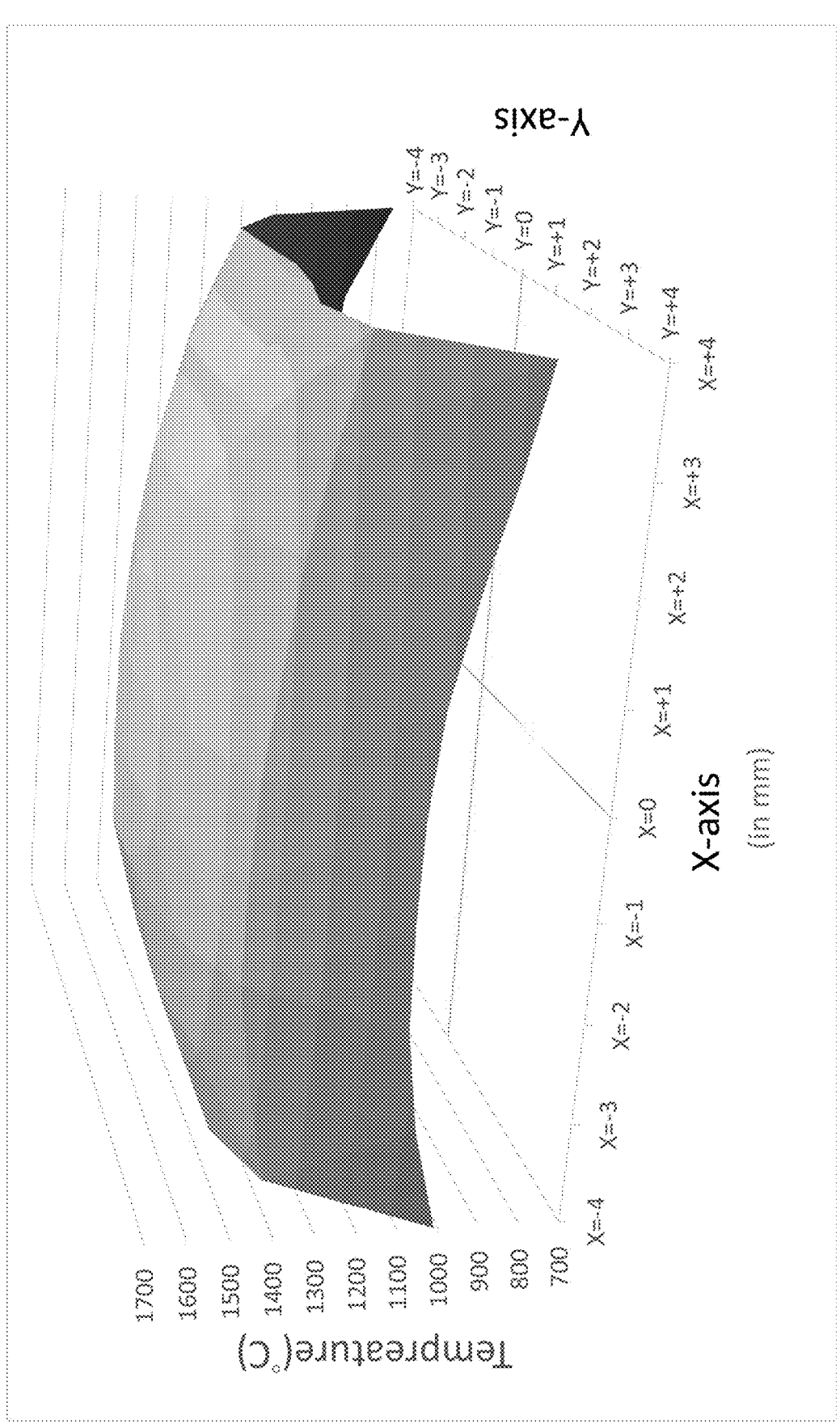
FIG. 5 shows a measured temperature distribution in the central cross section of the heating field under a linear-vertical torch module.

The three different types of torch heads 400 in FIG. 4A, are (a) a circular design, (b) a linear-vertical design, and (c) a linear-horizontal design. Any of the three torch modules can be chosen for a side-pump combiner workstation, depending on the fiber array size and the torch scanning speed selected. The former two types, circular and linear-vertical designs, are rather narrow in Z-dimension; therefore they must scan along the Z-direction during process in order to cover the entire fiber tapering/fusing length. Of these two, the linear-vertical type can be used for cases where the fiber array diameter d is large. As an example, FIG. 5 shows a measured temperature distribution in the central X-Y cross section, under a pair of linear-vertical torches. It can be seen that circularly-symmetric isothermal rings are built in the cross section. According to FIG. 5, a high-temperature (>1500° C.) central zone extends up to d~6 mm at least, which is useful for processing large size fiber arrays. The fibers locating in the same isothermal ring will experience the same temperature, thus possible to process plurality of individual pump fibers simultaneously and identically.

Figure 4B:
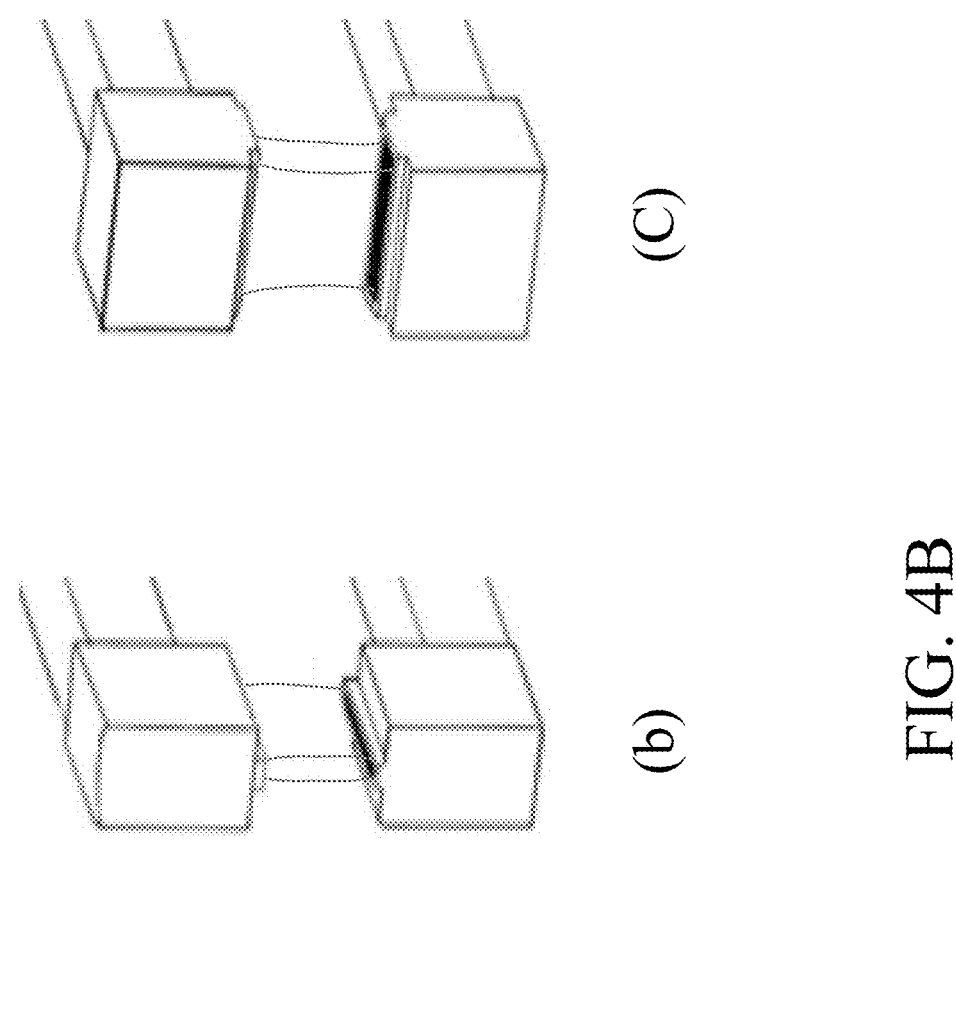
FIG. 4B illustrates the flame pillar patterns from the torch sets (a), (b), and (c), respectively.
Figure 6:
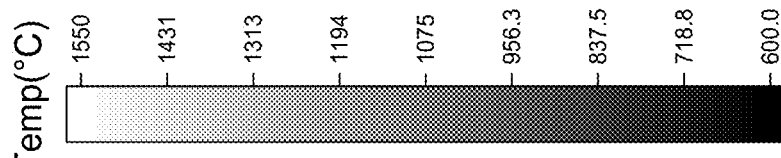
FIG. 6(*a*) and FIG. 6(*b*) each shows measured 3-D temperature distributions under a linear-horizontal torch module, with different $H_2/O_2$ gas flow rates resulting in different heating-field temperatures, with FIG. 6(*a*) showing a scenario of up to 1550° C., and with FIG. 6(*b*) showing a scenario of up to 1700° C.
Figure 6:
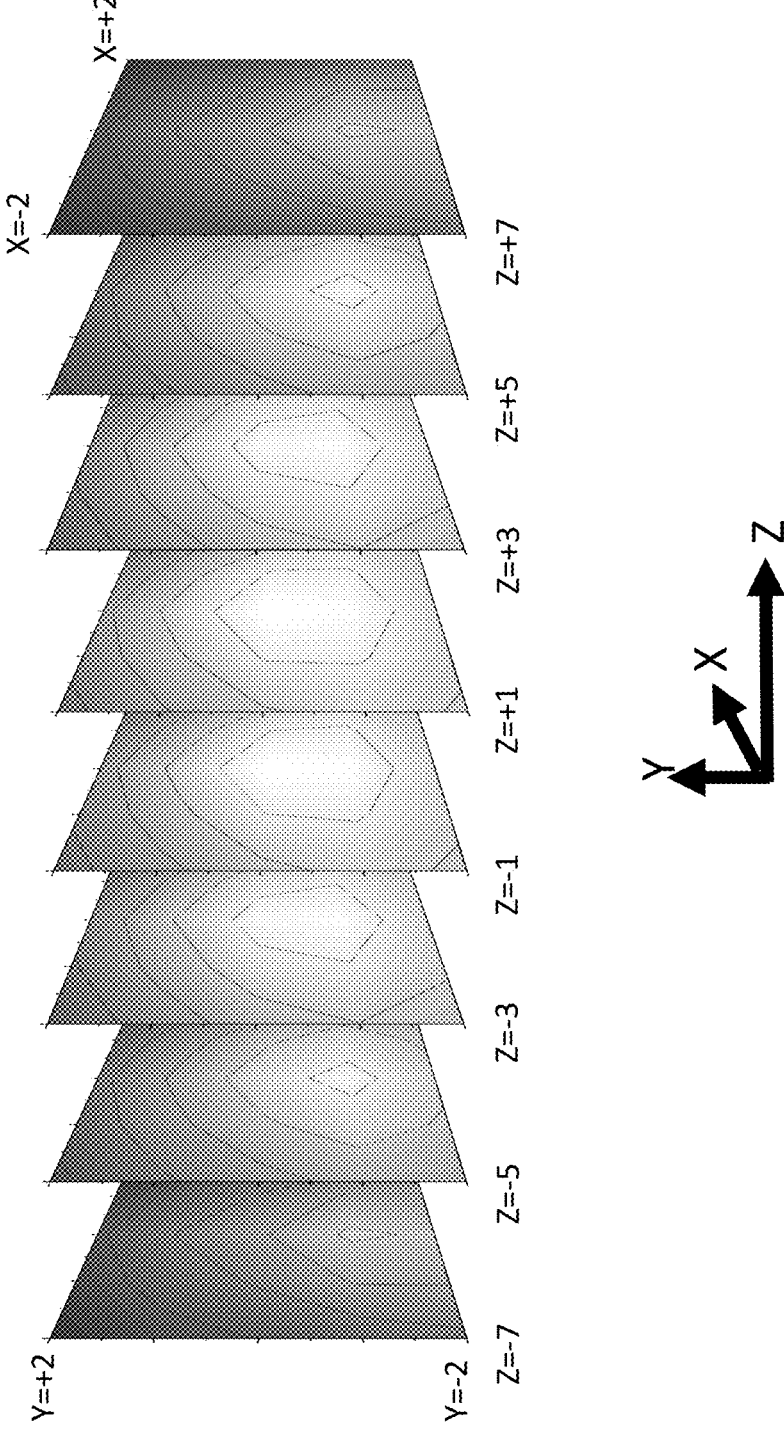
Figure 6:
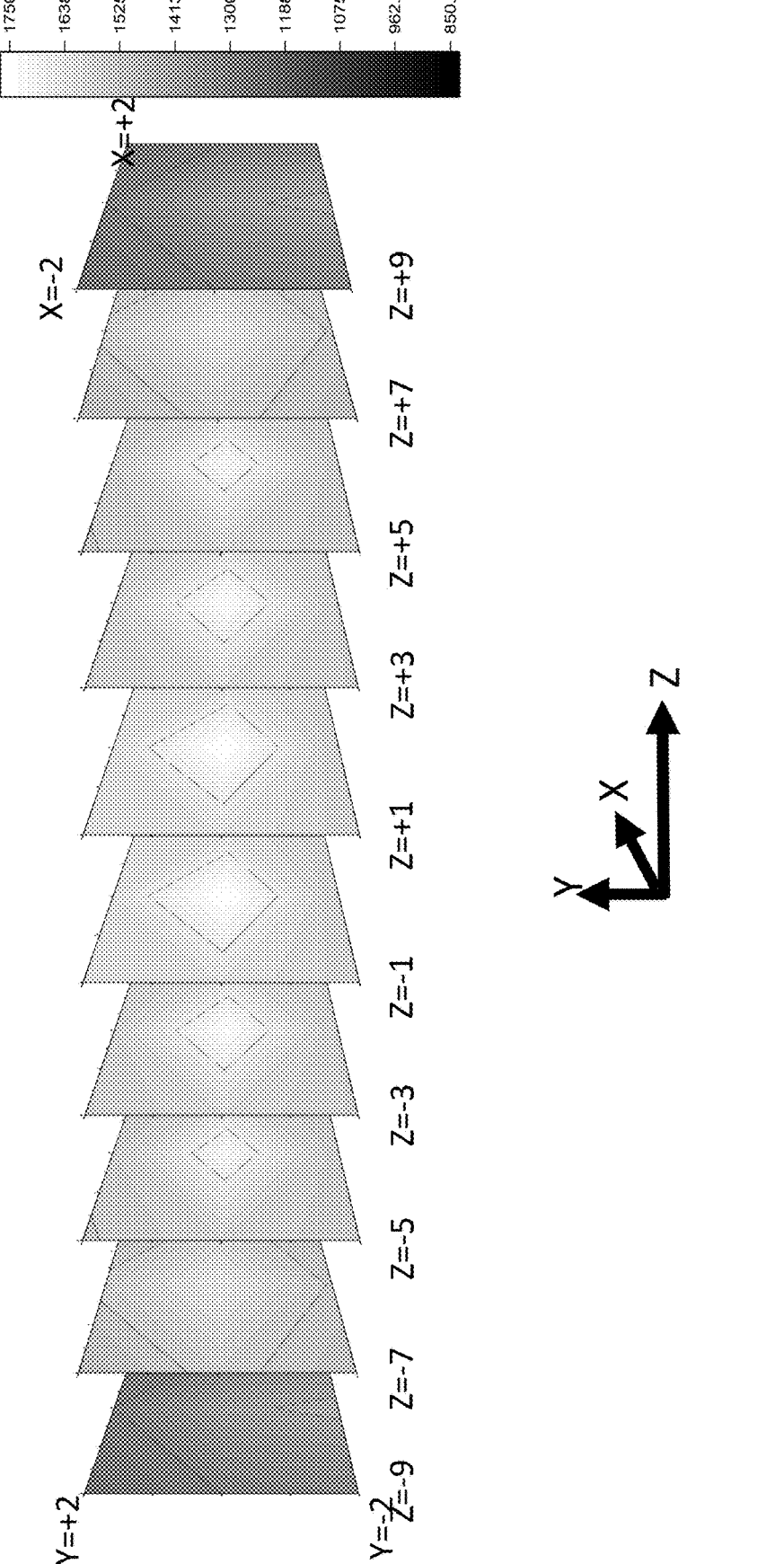

Regarding the third type of torch modules, namely the linear-horizontal design in part (c) of FIG. 4B, its heating field is long in Z dimension. FIG. 6(*a*) shows a measured 3-D temperature distribution at a given setting of $H_2/O_2$ flow rates. Similar to the first two types, circularly-symmetric isothermal rings are obtained in each cross section. In this heating field, its high-temperature (≥1500° C.) zone covers not only a long length (at least from z=−3 mm to z=+3 mm) but also a certain area in cross section (diameter >2 mm). Such field is suitable for pre-tapering multiple pump fibers in side-pump combiner fabrication, although a small range of torch scans along Z axis is still necessary in most cases because the pump-fiber tapers are usually longer than the high-temperature zone. FIG. 6(*b*) shows a stronger heating field (up to 1700° C.) by increasing the $H_2/O_2$ flow rates in this torch set. Its high temperature zone extends at least 10 mm long.

Figure 7:
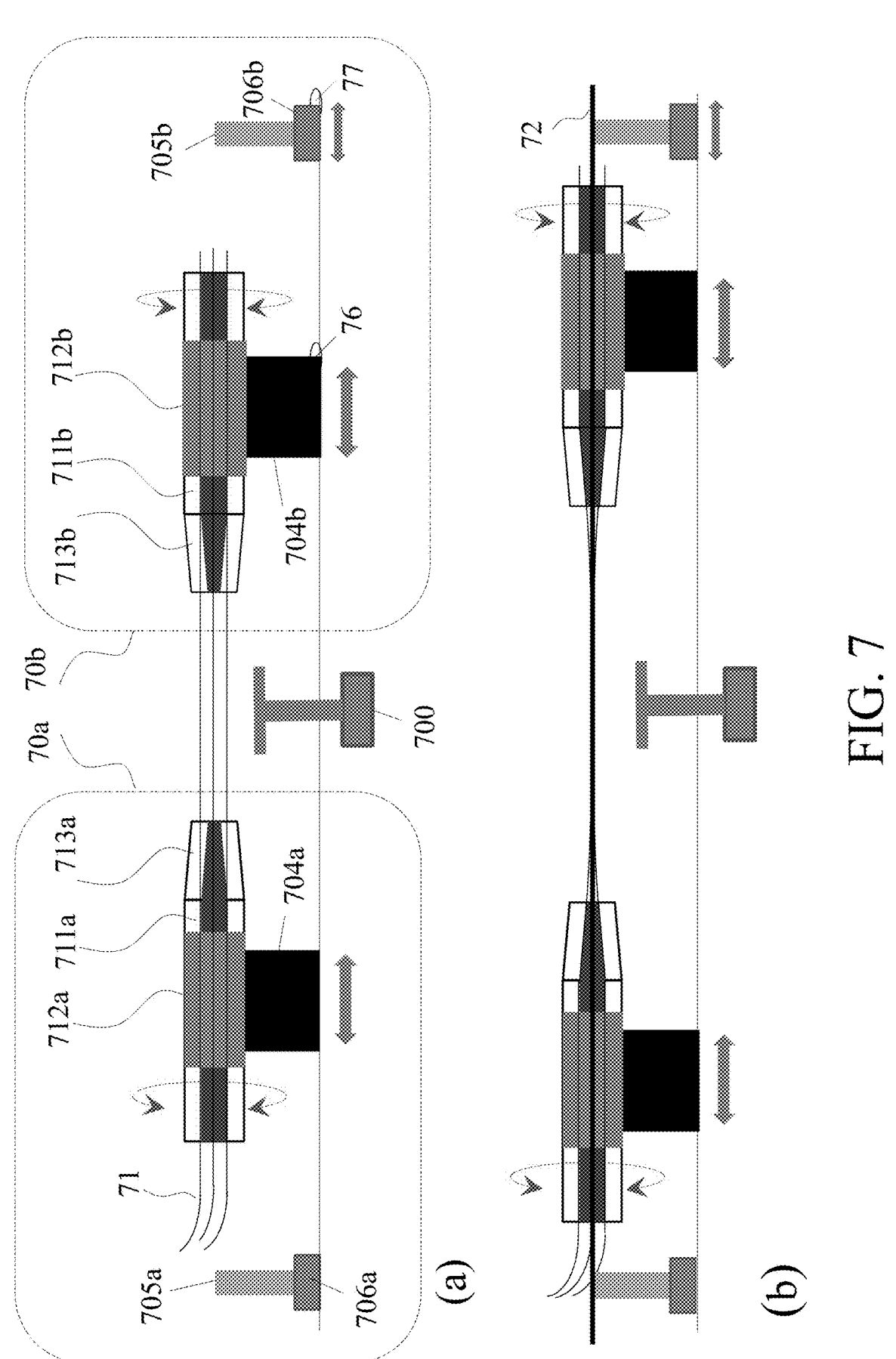
FIG. 7 illustrates the key part of the combiner manufacturing system at different processing steps, with part (a) of FIG. 7 showing a scenario of after pump fiber loading, and with part (b) of FIG. 7 showing a scenario of after pump fiber tapering, signal fiber loading, and fiber bundling.

Combining the proposed schemes illustrated in FIG. 2, FIG. 3, FIG. 4A, a complete set of manufacturing system for side-pump combiners can be formed. A schematic illustration of the system is shown in FIG. 7. For the sake of clarity, FIG. 7 only includes the key part of the system, namely the fiber holding mechanism. As shown in FIG. 7, the fiber holding mechanism may be formed by a pair of left and right optical fiber clamping units, 70*a* and 70*b*. Each unit 70*a*/70*b* consists of a pump-fiber clamping structure for clamping six pump fibers (refer to FIG. 3) as well as a signal fiber clamp for clamping a signal fiber (refer to FIG. 2). It can be seen from FIG. 7 that each shaft, 711*a* or 711*b*, has a convergent extension in front, 713*a* or 713*b*. Since the slots in 713*a*/713*b* are sloped, after pump fiber tapering is done, all tapers can be slightly bent concentrically toward the signal fiber during fiber bundling. This ensures the entire tapered portion of each pump fiber to be well attached to the signal fiber. Depending on the taper design, the inclination angle of 713*a*/713*b* is generally small (2°~5°).

Moreover, a packaging module 700 in the middle zone is shown in FIG. 7. This module is used for pre-packaging the finished combiner for protection purpose and also to ease its removal from the manufacturing system. The module 700 can be motor-driven in two dimensions, forward/backward and up/down; thus, via its outstretched arm, it can deliver and locate a package piece right to the spot.

In an embodiment of the present disclosure, the $H_2/O_2$ flame with a linear-horizontal torch module is adopted as the heating source. Based on this system, a method for manufacturing a (6+1)×1 side-pump combiner comprises the following steps or stages. Prior to operation, make sure that the two fiber clamping units 70*a* and 70*b* are well aligned, all program parameters are properly set, and the central portion of each fiber is stripped and cleaned before loading.

In a first stage of the manufacturing method, referring to part (a) of FIG. 7, through the opening on the top of sleeves 712*a*/712*b*, six pump fibers, 71, may be sequentially inserted into six pump-fiber slots by rotating the shafts 711*a*/711*b*. With each fiber sitting at the bottom of the flat section of each slot and straightened, the fiber may be clamped in place, (e.g., via inserts or any other way). A tension sensor 76 may support closed-loop control of a stretching force applied to the pump-fiber array.

In a second stage of the manufacturing method, under a properly selected heating field, the pump-fiber array may be tapered by gradually moving apart the motor-driven sliding modules 704*a* and 704*b*. During pulling, the torch module may also longitudinally scan back and forth, thereby ensuring a sufficient taper length. The six tapers may be kept in their places for the time being.

In a third stage of the manufacturing method, referring to part (b) of FIG. 7, through the opening on the top of sleeves 712a/712b as well as the signal-fiber slot in shafts 711a/711b, the signal fiber 72 may be guided to the center through-channel of each of shafts 711a/711b, and then clamped by the signal fiber clamps, 705a/705b. The signal fiber may be straightened, with the tension sensor 77 supporting closed-loop control of a stretching force applied to the signal fiber.

In a fourth stage of the manufacturing method, in order to bundle the six pump tapers to the signal fiber, the pump-fiber array may first be loosened by slightly moving closer the sliding modules 704a and 704b toward each other. Then, the pump fiber clamping position may be switched from the flat section of 711a/711b to the tilted section in 713a/713b (e.g., via inserts or any other way). After all the surrounding tapers are concentrically bent and adequately reaching the signal fiber, with monitoring and controlling the tension on the pump-fiber array, slowly rotate the shafts 711a and 711b in opposite directions respectively, or slowly rotate the shaft 711b (or 711a) only, to result in a relative rotation between the shafts thus forming a fiber bundle. The six pump tapers may now be fully wound on the signal fiber as shown in part (b) of FIG. 7.

In a fifth stage of the manufacturing method, under a properly selected heating field, the fiber bundle may be fused together. The fusion zone is to cover the converging portion of the pump tapers but does not extend to the diverging portion. During fusing, the torch module may need to longitudinally scan over a small range, thereby ensuring that the entire converging length is fused to the signal fiber.

In a sixth stage of the manufacturing method, the diverging portion of each pump fiber may be pulled off after fusion is finished.

In a seventh stage of the manufacturing method, the (6+1)×1 combiner may be pre-packaged and removed from the manufacturing system.

Virtually, except fiber loadings, the entire process may automatically proceed under the control of one or more processors of a control unit (e.g., a programmable central control board). Following the preset processing profiles, all the actions may be controlled with dynamic parameters, including mechanical module positioning and motions, shaft rotations, $H_2/O_2$ flow rates, torch scanning pattern and cycles, fiber stretching forces, etc. Since all fibers are in place from start to finish, high manufacturing repeatability is expected.

When evaluating a (N+1)×1 pump/signal combiner, key parameters include its pump power coupling efficiency, maximal power handling capacity, as well as signal insertion loss and beam quality. In order to produce a qualified side pump combiner, the design and manufacturing process of the combiner are very important. First of all, in order to obtain high pump coupling efficiency, the pump taper length and taper ratio should be carefully chosen based on the pump/signal fiber specifications as well as the pump input NA distribution. An optimal taper design is to minimize not only the uncoupled pump portion (remaining in the pump fiber) but also the over-coupled portion (leaking to the outside, or worst, into the coating of DCF causing high heat). Secondly, many essential details should be paid attention to during combiner fabrication, such as a well-aligned fiber clamping system, optimal heating temperature and torch scanning pattern and speed in every step, optimal fusing zone over the bundle, etc. Since the signal fiber is very sensitive to mechanical stress and heating condition, any system misalignment or overheating can cause micro deformations in the signal fiber, thus increasing signal loss and degrading output beam quality.

During side-pump combiner fabrication, the evolution of pump coupling efficiency can be monitored in real time if pump light is injected into one or more pump input ports and a power meter is measuring the power at the signal fiber output end. Or, if a signal light beam is injected into the signal fiber and a power meter or a beam profiler is measuring the power or beam profile at its output end, the evolution of signal insertion loss or beam quality can be monitored in real time.

Samples of (6+1)×1 side-pump combiner have been fabricated based on the system and the procedure described above. The pump fiber and signal fibers used in the samples are Nufern 200/220 (NA=0.22) fiber and Nufern 20/400 DCF (NA=0.06/0.46), respectively. These combiners have shown low signal loss of <0.1 dB (forward or backward) and high pump coupling efficiency 95%, which indicates their great potential for high-power fiber lasers and amplifiers.

Feature Highlights

In view of the above, certain features of the various proposed schemes are highlighted below.

In one aspect, an apparatus may include an all-fiber side-pump combiner fabrication system and a control unit. The all-fiber side-pump combiner fabrication system may be configured to receive a fiber group comprising a signal fiber and a plurality of pump fibers. The control unit may be coupled to control operations of the side-pump combiner fabrication system to process the fibers to produce a (N+1)×1 combiner with N side pump fibers, where N is a positive integer. In controlling the operations of the side-pump combiner fabrication system, the control unit may control the side-pump combiner fabrication system with respect to at least a mechanical positioning, a mechanical motion, a mechanical speed, a heating temperature, a dynamic heating-zone scanning pattern and speed, a fiber tension, and a fabrication recipe.

In some implementations, the all-fiber side-pump combiner fabrication system may include: (a) first and second pump-fiber clamping fixtures each mounted on a respective one of first and second sliding modules such that the central longitudinal axis of each of the first and second pump-fiber clamping fixtures is aligned with a system axis of the side-pump combiner fabrication system and that each of the first and second pump-fiber clamping fixtures is slidingly movable in directions along the system axis with a closed-loop tension control on the clamped pump-fiber array; (b) first and second signal-fiber clamps each mounted on a respective adjustment module such that the fiber clamping positions are adjusted to ensure a clamped signal fiber coincident with the system axis (i.e., the central longitudinal axis of each of the first and second pump-fiber clamping fixtures), with at least one of the adjustment modules being slidingly movable in a direction parallel to the system axis to provide tension auto-control on the signal fiber; (c) a heating source configured to create a heating zone on the fibers around along the system axis. Each of the first and second pump-fiber clamping fixtures may include a sleeve and a shaft surrounded by and rotatably received in the sleeve such that: (i) the shaft comprises a signal-fiber slot and a plurality of pump-fiber slots; (ii) the shaft comprises a convergent extension section resulting in each of a plurality of pump-fiber slots with a flat section and a tilted section; (iii) the shaft further comprises a through-channel along the central longitudinal axis for a signal fiber passing through without interference; (iv) the signal-fiber slot is configured to guide a signal fiber to the through-channel;

and (v) each of the plurality of pump-fiber slots is configured to receive and clamp a respective one of a plurality of pump fibers of the pump-fiber array. In operation, the control unit may be configured to perform operations comprising: (1) with the plurality of pump fibers loaded in the plurality of pump-fiber slots of each of the first and second pump-fiber clamping fixtures and clamped along the flat section of each slot: (1a) controlling the first and second sliding modules to gradually move the first and second pump-fiber clamping fixtures apart to taper the pump-fiber array; (1b) during the tapering controlling the heating source to longitudinally scan the heating zone back and forth along the system axis to achieve a predefined taper ratio and taper length for each of the plurality of pump fibers; (2) with the signal fiber being guided to the through-channel of each of the first and second pump-fiber clamping fixtures (through each of their signal-fiber slots) and then clamped by the first and second signal-fiber clamps, controlling the slidingly-movable adjustment module(s) to straighten the signal fiber while monitoring the stretching force applied to the signal fiber; (3) slightly moving closer the sliding modules toward each other so as to slightly loose the pump-fiber array, and then switching the fiber clamping positions of the plurality of pump fibers on the shaft in the plurality of slots from the flat section to the tilted section to result in surrounding pump tapers that are concentrically bent and adequately reaching the signal fiber; (4) with monitoring and controlling the tension on the pump-fiber array, slowly rotating either or both of the shafts of the first and second pump-fiber clamping fixtures to result in a relative rotation between the shafts of the first and second pump-fiber clamping fixtures to form a fiber bundle; and (5) controlling the heating source to fuse the fiber bundle with a fusion range covering the converging portion of the pump tapers.

In some implementations, the plurality of pump-fiber slots may be uniformly distributed around the shaft.

In some implementations, a depth of each of the plurality of pump-fiber slots may be identical. Moreover, a distance between the bottom of each of two of the plurality of pump-fiber slots on opposite sides of the shaft may constitute an array diameter. In some implementations, the array diameter may not be less than 2 mm.

In some implementations, the sleeve may have an opening through which the signal fiber and the plurality of pump fibers are loaded into the signal-fiber slot and the plurality of pump-fiber slots, respectively.

In some implementations, the heating source may be based on hydrogen/oxygen (H2/O2) flames from a torch module that comprises two opposing flame torch heads facing each other with an adjustable spacing.

In some implementations, each of the torch heads may be of a circular design configured to produce a flame with a circular shape. Alternatively, each of the torch heads may be of a linear-vertical design configured to produce a flame with a linear-vertical shape with respect to the fiber array. Still alternatively, each of the torch heads may be of a linear-horizontal design configured to produce a flame with a linear-horizontal shape with respect to the fiber array.

In another aspect, an all-fiber side-pump combiner fabrication method may involve: (1) with a plurality of pump fibers of a fiber array loaded and clamped in a plurality of pump-fiber slots (to their flat sections) of each of first and second pump-fiber clamping fixtures each mounted on a respective one of first and second sliding modules such that the central longitudinal axis of each of the first and second pump-fiber clamping fixtures is aligned with a system axis of a side-pump combiner fabrication system and that each of the first and second pump-fiber clamping fixtures is slidingly movable in directions along the system axis: (1a) controlling the first and second sliding modules to gradually move the first and second pump-fiber clamping fixtures apart to taper the pump-fiber array; (1b) during the tapering controlling a heating source to longitudinally scan the heating zone back and forth along the system axis to achieve a predefined taper ratio and taper length for each of the plurality of pump fibers; (2) with a signal fiber being guided to a through-channel of each of the first and second pump-fiber clamping fixtures (through a signal-fiber slot of each of the first and second pump-fiber clamping fixtures) and then clamped by first and second signal-fiber clamps each mounted on a respective adjustment modules with at least one of the modules being slidingly movable, controlling the slidingly-movable adjustment module to straighten the signal fiber while monitoring the stretching force applied to the signal fiber; (3) slightly moving closer the sliding modules toward each other so as to slightly loose the pump-fiber array and then switching the fiber clamping positions of the plurality of pump fibers on a shaft of each of the first and second pump-fiber clamping fixtures in a plurality of slots on the shaft from a flat section to a tilted section to result in surrounding pump tapers that are concentrically bent and adequately reaching the signal fiber; (4) with monitoring and controlling the tension on the pump-fiber array, slowly rotating either or both of the shafts of the first and second pump-fiber clamping fixtures to result in a relative rotation between the shafts of the first and second pump-fiber clamping fixtures to form a fiber bundle; and (5) controlling the heating source to fuse the fiber bundle with a fusion range covering the converging portion of the pump tapers. In some implementations, the all-fiber side-pump combiner fabrication system may include: (a) the first and second pump-fiber clamping fixtures mounted on the first and second sliding modules, respectively, such that the central longitudinal axis of each of the first and second pump-fiber clamping fixtures is aligned with the system axis of the side-pump combiner fabrication system and that each of the first and second pump-fiber clamping fixtures is slidingly movable in directions along the system axis; (b) the first and second signal-fiber clamps each mounted on a respective adjustment module such that the fiber clamping positions are adjusted to ensure a clamped signal fiber coincident with the system axis (i.e., the central longitudinal axis of each of the first and second pump-fiber clamping fixtures), with at least one of the adjustment modules being slidingly movable in a direction parallel to the system axis to provide tension auto-control on the signal fiber; (c) a heating source configured to create a heat zone on the fibers around the system axis. In some implementations, each of the first and second pump-fiber clamping fixtures comprises a sleeve and the shaft surrounded by and rotatably received in the sleeve such that: (i) the shaft comprises a signal-fiber slot and a plurality of pump-fiber slots; (ii) the shaft comprises a convergent extension section resulting in each of the plurality of pump-fiber slots with the flat section and the tilted section; (iii) the shaft further comprises a through-channel along the central longitudinal axis for a signal fiber passing through without interference; (iv) the signal-fiber slot is configured to guide the signal to the through-channel; and (v) each of the plurality of pump-fiber slots is configured to receive and clamp a respective one of the plurality of pump fibers of the fiber array.

In some implementations, the plurality of pump-fiber slots may be uniformly distributed around the shaft.

In some implementations, a depth of each of the plurality of pump-fiber slots may be identical. Moreover, a distance between the bottom of each of two of the plurality of pump-fiber slots on opposite sides of the shaft may constitute an array diameter. In some implementations, the array diameter may not be less than 2 mm.

In some implementations, the sleeve may have an opening through which the signal fiber and the plurality of pump fibers are loaded into the signal-fiber slot and the plurality of pump-fiber slots, respectively.

In some implementations, the heating source may be based on hydrogen/oxygen (H2/O2) flames from a torch module that comprises two opposing flame torch heads facing each other with an adjustable spacing. In some implementations, each of the torch heads may be of a circular design configured to produce a flame with a circular shape. Alternatively, each of the torch heads may be of a linear-vertical design configured to produce a flame with a linear-vertical shape with respect to the fiber array. Still alternatively, each of the torch heads may be of a linear-horizontal design configured to produce a flame with a linear-horizontal shape with respect to the fiber array.

In some implementations, the method may further involve: (6) pulling off a diverging portion of each of the plurality of pump fibers after fusion to result in a (N+1)×1 combiner; and (7) pre-packing the (N+1)×1 combiner before removal from the side-pump combiner fabrication system, with N denoting a number of pump fibers in the plurality of pump fibers.

Additional Notes

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. An apparatus, comprising:
   an all-fiber side-pump combiner fabrication system configured to receive a fiber group comprising a signal fiber and a plurality of pump fibers; and
   a control unit coupled to control operations of the all-fiber side-pump combiner fabrication system to process the fiber group to produce a (N+1)×1 combiner with N side pump fibers,
   wherein N is a positive integer,
   wherein, in controlling the operations of the side-pump combiner fabrication system, the control unit controls the side-pump combiner fabrication system with respect to at least one of a mechanical positioning, a mechanical motion, a mechanical speed, a heating temperature, a dynamic heating-zone scanning pattern and speed, a fiber tension, and a fabrication recipe,
   wherein the all-fiber side-pump combiner fabrication system comprises first and second pump-fiber clamping fixtures, each of the first and second pump-fiber clamping fixtures loaded with the plurality of pump fibers to form a pump-fiber array, each of first and second pump-fiber clamping fixtures mounted on a respective one of first and second sliding modules such that a central longitudinal axis of each of the first and second pump-fiber clamping fixtures is aligned with a system axis of the side-pump combiner fabrication system and that each of the first and second pump-fiber clamping fixtures is slidingly movable in directions along the system axis with a closed-loop tension control on the clamped pump-fiber array,
   wherein each of the first and second pump-fiber clamping fixtures comprises a sleeve and a shaft surrounded by and rotatably received in the sleeve, the shaft comprising (i) a signal-fiber slot for the signal fiber to pass through at the central longitudinal axis and (ii) a plurality of pump-fiber slots for receiving and clamping the pump fibers of the pump-fiber array at positions circumferentially surrounding the signal fiber.

2. The apparatus of claim 1, wherein the all-fiber side-pump combiner fabrication system further comprises:
   first and second signal-fiber clamps, each mounted on a respective adjustment module such that the fiber clamping positions are adjusted to ensure a clamped signal fiber coincident with the system axis or the central longitudinal axis of each of the first and second pump-fiber clamping fixtures, with at least one of the adjustment modules being slidingly movable in a direction along the system axis to provide a closed-loop tension control on the signal fiber; and
   a heating source to create a heating zone on the fibers around the system axis.

3. The apparatus of claim 2, wherein the heating source is based on hydrogen/oxygen (H2/O2) flames.

4. The apparatus of claim 3, wherein a H2/O2 torch module comprises two opposing torch heads facing each other to produce either or both of hydrogen/oxygen flames, and wherein a spacing between the two torch heads is adjustable.

5. The apparatus of claim 4, wherein each of the torch heads is of a circular design configured to produce a flame with a circular shape.

6. The apparatus of claim 4, wherein each of the torch heads is of a linear-vertical design configured to produce a flame with a linear-vertical shape with respect to the pump-fiber array.

7. The apparatus of claim 4, wherein each of the torch heads is of a linear-horizontal design configured to produce a flame with a linear-horizontal shape with respect to the pump-fiber array.

8. The apparatus of claim 1, wherein the shaft further comprises a convergent extension section resulting in the plurality of pump fiber slots with a flat section and a tilted section;
   wherein the shaft further comprises a through-channel along the central longitudinal axis for the signal fiber passing through without interference and the signal-fiber slot is configured to guide the signal fiber to the through-channel.

9. The apparatus of claim 2, wherein, in operation, the control unit is configured to perform operations comprising:
   with the plurality of pump fibers loaded in the plurality of pump-fiber slots of each of the first and second pump-fiber clamping fixtures and clamped along the flat section of each slot:
      controlling the first and second sliding modules to gradually move the first and second pump-fiber clamping fixtures apart to taper the pump-fiber array;
      during the tapering controlling the heating source to longitudinally scan the heating zone back and forth along the system axis to achieve a predefined taper ratio and taper length for each of the plurality of pump fibers;
   with the signal fiber being guided to the through-channel of each of the first and second pump-fiber clamping fixtures through each of their signal-fiber slots and then clamped by the first and second signal-fiber clamps, controlling the slidingly-movable adjustment module to straighten the signal fiber while monitoring the stretching force applied to the signal fiber;

slightly moving closer the pump-fiber sliding modules toward each other so as to slightly loose the pump-fiber array, and then switching the clamping positions of the plurality of pump fibers on the shaft in a plurality of slots from the flat section to the tilted section to result in surrounding pump tapers that are concentrically bent and adequately reaching the signal fiber;

with monitoring and controlling the tension on the pump-fiber array, slowly rotating either or both of the shafts of the first and second pump-fiber clamping fixtures to result in a relative rotation between the shafts of the first and second pump-fiber clamping fixtures to form a fiber bundle; and controlling the heating source to fuse the fiber bundle with a fusion range covering the converging portion of the pump tapers.

10. The apparatus of claim 8, wherein the plurality of pump-fiber slots are uniformly distributed around the shaft.

11. The apparatus of claim 10, wherein a depth of each of the plurality of pump-fiber slots is identical, and wherein a distance between a bottom of each of two of the plurality of pump-fiber slots on opposite sides of the shaft constitutes an array diameter.

12. The apparatus of claim 8, wherein the sleeve has an opening through which the signal fiber and the plurality of pump fibers are loaded into the signal-fiber slot and the plurality of pump-fiber slots, respectively.

* * * * *